Figure 1:
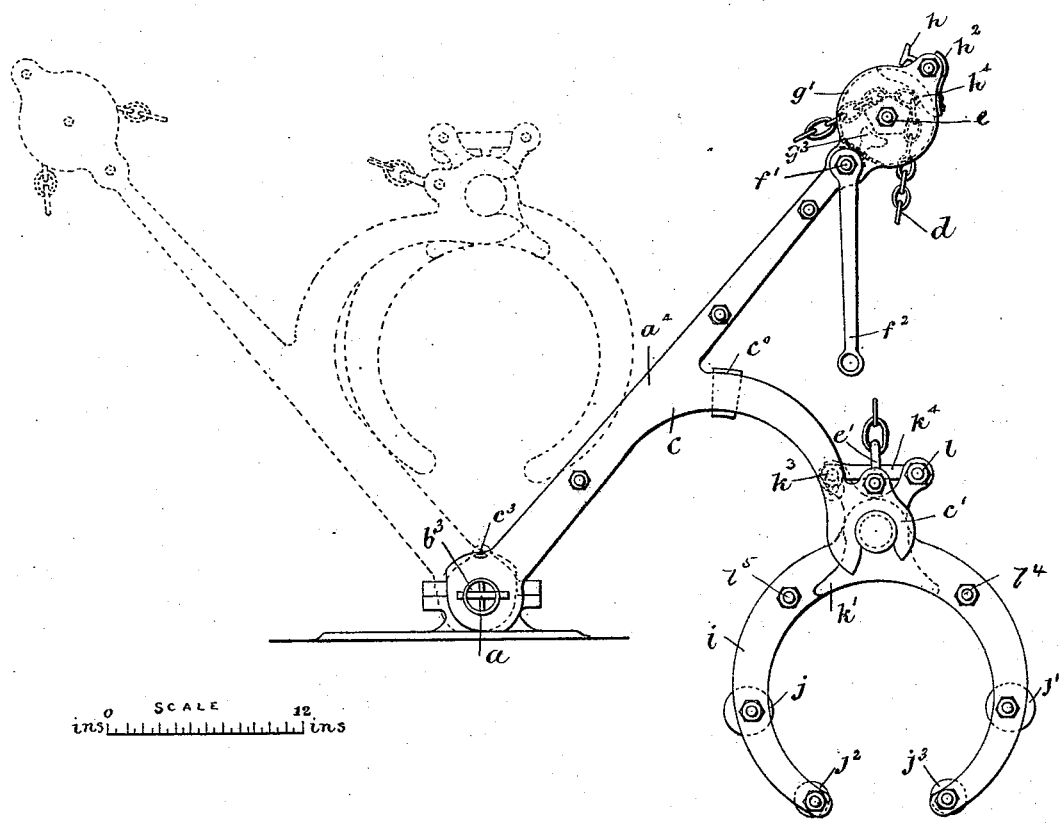

(No Model.)  6 Sheets—Sheet 1.

C. DANN.
UNIVERSAL TORPEDO DROPPING GEAR.

No. 455,742.  Patented July 14, 1891.

Witnesses:
E. B. Bolton
E. L. Richards

Inventor:
Cardigan Dann
By Richards &c.
his Attorneys.

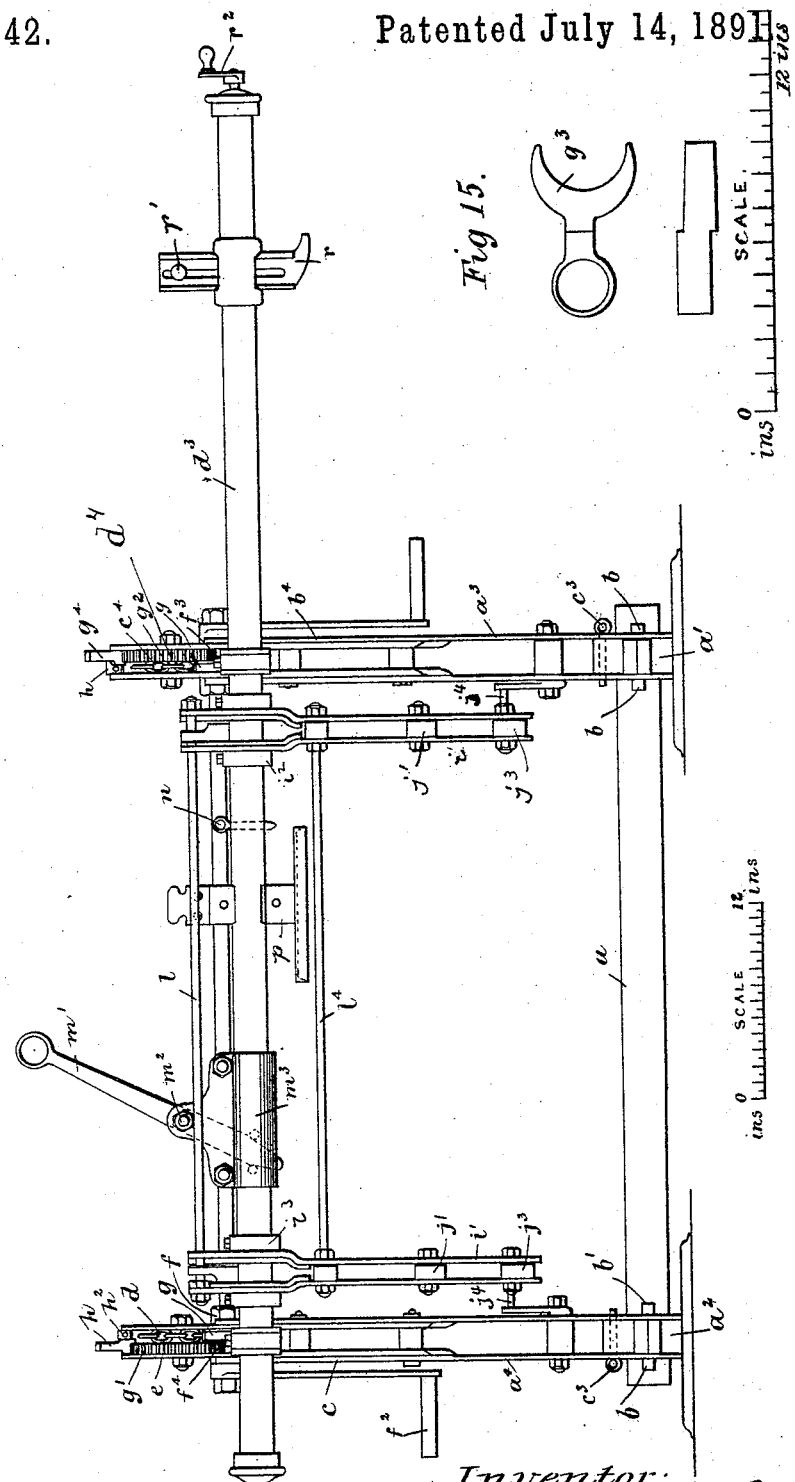

(No Model.)  6 Sheets—Sheet 3.

C. DANN.
UNIVERSAL TORPEDO DROPPING GEAR.

No. 455,742.  Patented July 14, 1891.

Witnesses:
E. B. Bolton
C. L. Richards

Inventor:
Cardigan Dann
By Richards &
his Attorneys (No Model.) 6 Sheets—Sheet 4.

C. DANN.
UNIVERSAL TORPEDO DROPPING GEAR.

No. 455,742. Patented July 14, 1891.

Witnesses:
E. B. Bolton
C. L. Richards

Inventor:
Cardigan Dann
By Richards
his Attorneys.

(No Model.) 6 Sheets—Sheet 5.
C. DANN.
UNIVERSAL TORPEDO DROPPING GEAR.
No. 455,742. Patented July 14, 1891.
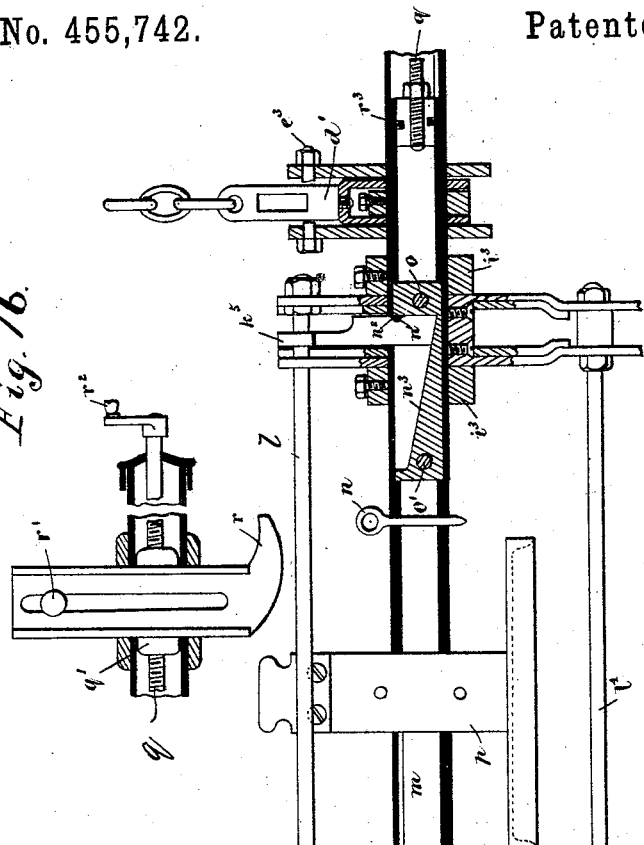
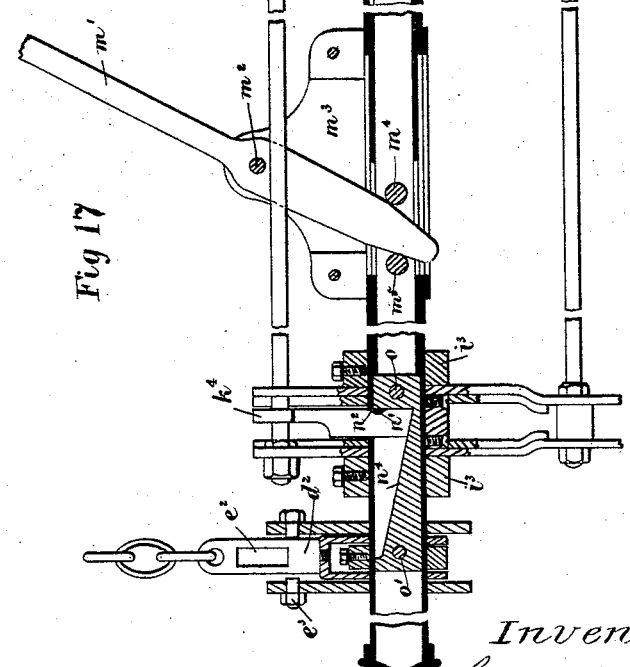
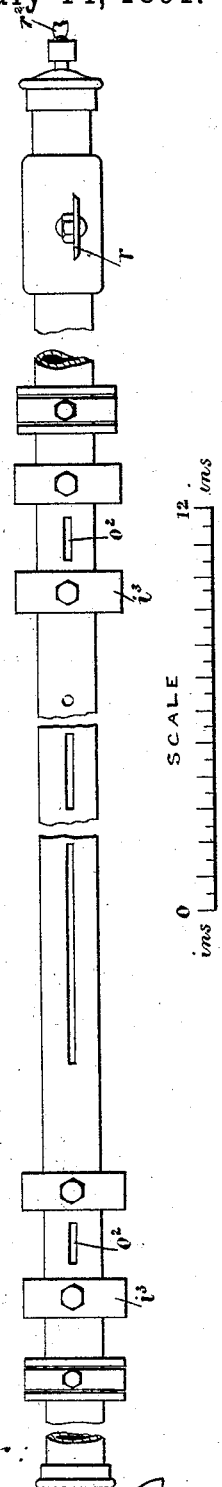
Witnesses:
E. B. Bolton
E. L. Richards
Inventor:
Cardigan Dann
By Richards
his Attorneys.

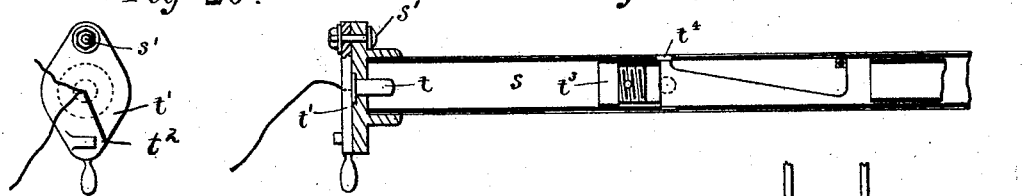
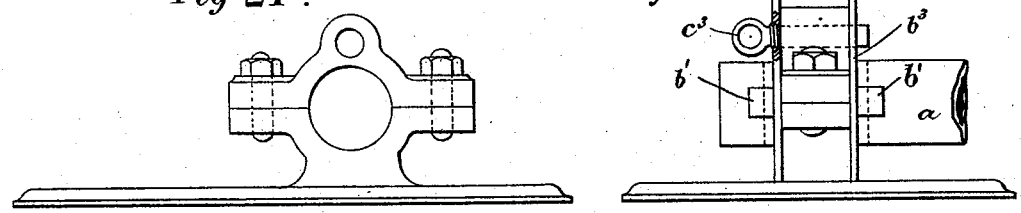
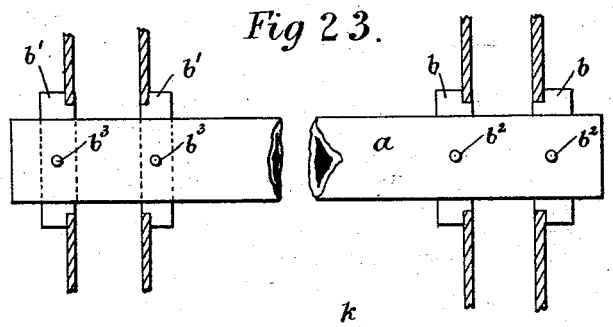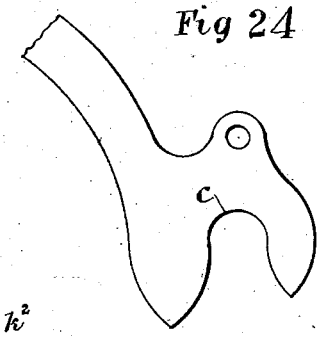
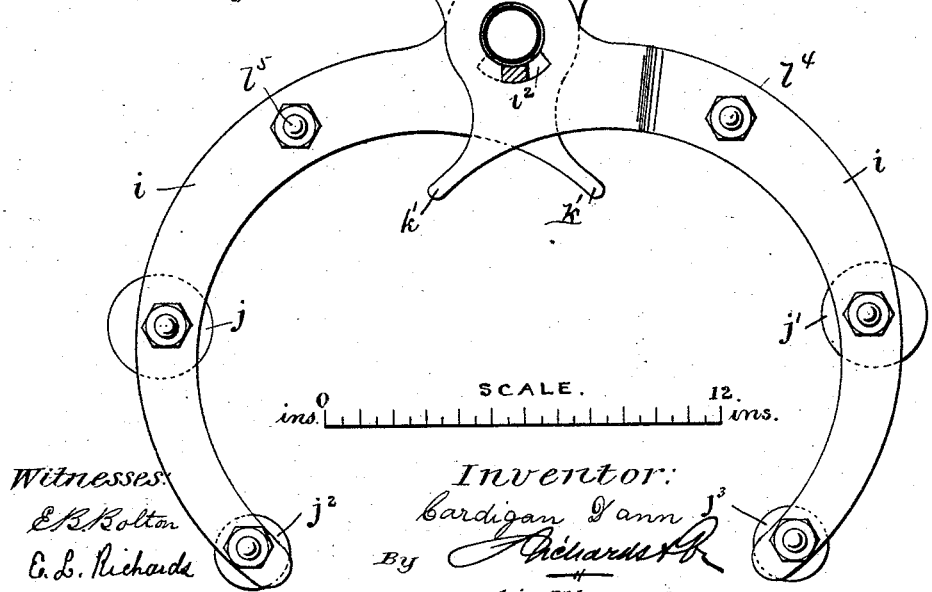

UNITED STATES PATENT OFFICE.

CARDIGAN DANN, OF WILLIAMSTOWN, VICTORIA.

UNIVERSAL TORPEDO-DROPPING GEAR.

SPECIFICATION forming part of Letters Patent No. 455,742, dated July 14, 1891.

Application filed May 13, 1890. Serial No. 351,586. (No model.) Patented in Victoria February 22, 1887, No. 4,943, and in England January 22, 1889, No. 1,195.

*To all whom it may concern:*

Be it known that I, CARDIGAN DANN, a subject of the Queen of England, residing at Williamstown, in the Colony of Victoria, Australia, have invented a new and useful Universal Torpedo-Dropping Gear, (for which I have obtained patents in the Colony of Victoria, No. 4,943, bearing date February 22, 1887, and in England, No. 1,195, dated January 22, 1889,) of which the following is a specification.

My improved torpedo-dropping gear has for its object means whereby a torpedo may be quickly and firmly gripped, launched, dispatched, or replaced inboard when exercising or maneuvering in smooth or rough water without removing or shipping or unshipping the davits, as is generally the case with other apparatus.

By the use of my invention two persons may easily exercise or maneuver torpedoes of various diameters with facility and without the slightest possibility of an accident or injury to the thin shell of the torpedo.

The apparatus which my invention is intended to supplant is that which is known as the "service torpedo-dropping gear," the disadvantages attending the manipulation of which are, first, a torpedo when launched overboard by means of the davits heels with the heel of the boat, and is consequently prevented from dropping vertically, with the result that the tail-frame strikes the water diagonally, deflecting the torpedo from the direction of the object of attack; secondly, the use of tackle with the davits necessitates the employment of a number of skilled hands to either launch the torpedoes or lift them out of the water; thirdly, the davits cannot be shipped or unshipped with facility; fourthly, the tongs of the service-gear are difficult of adaptation to different patterns of maneuvered torpedoes, and therefore to change the tongs when required and substitute others necessitates the employment of a machanic; fifthly, the gear fitted for the starboard side of boat is not interchangeable—that is to say, it is not adapted for the port side.

Now I entirely overcome the foregoing disadvantages, and before I describe the combination and arrangement of the several parts of my dropping-gear I will distinguish the various figures upon the accompanying sheets of drawings, which are to be taken as part of this specification and read therewith.

Figures 8, 9, 10, 11:
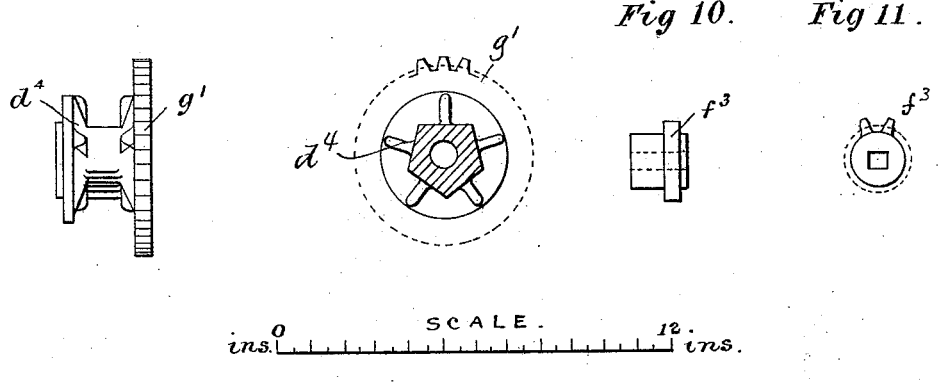
Figure 3:
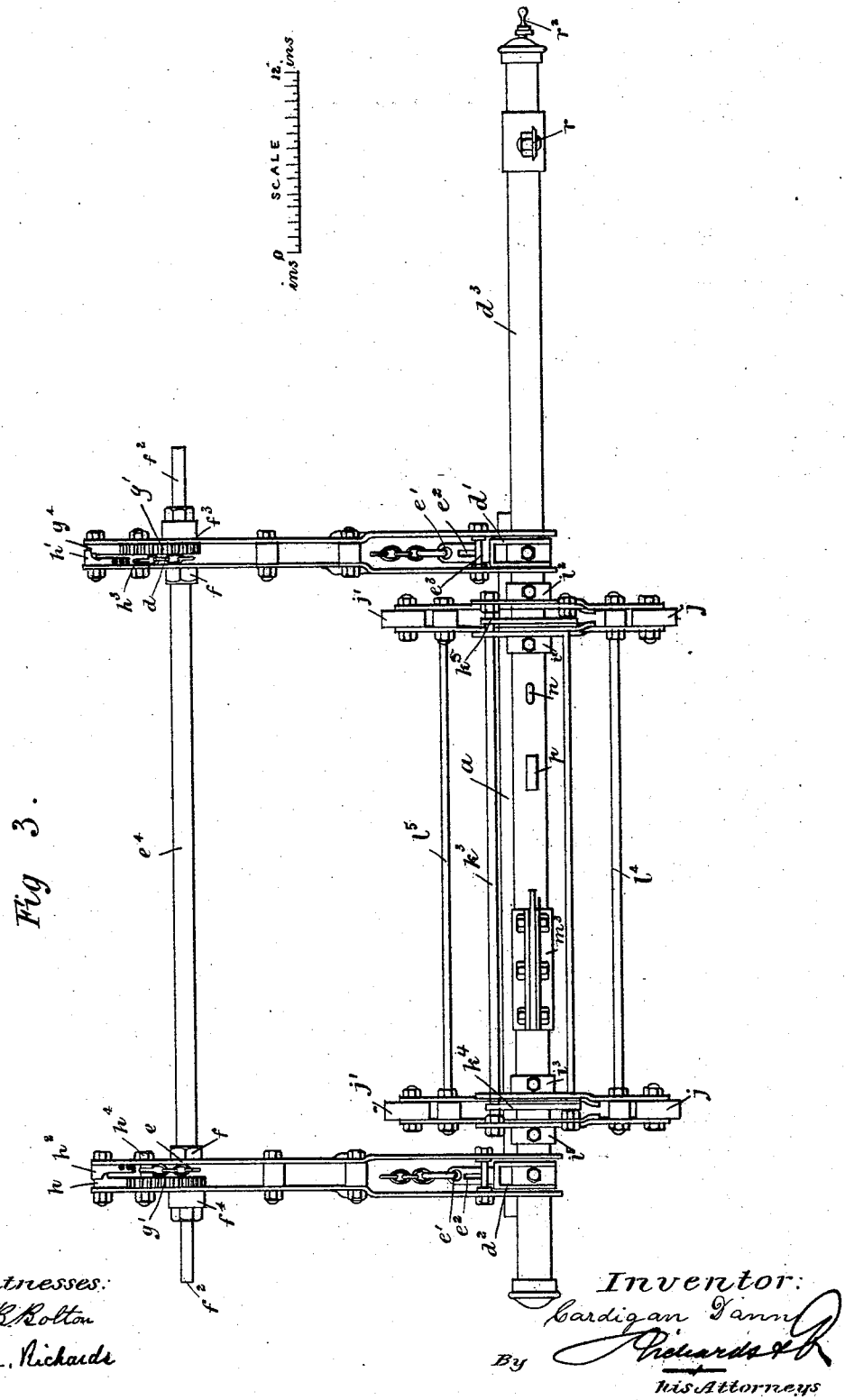
Figure 4:
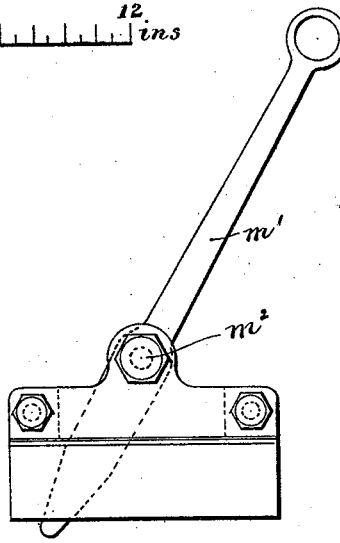
Figure 5:
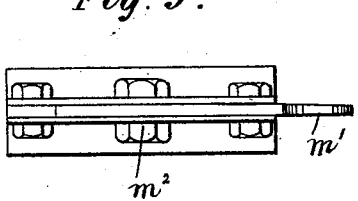
Figure 6:
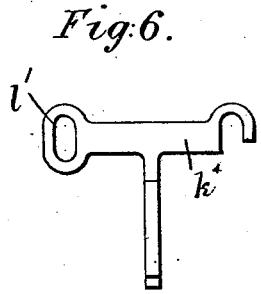
Figure 7:
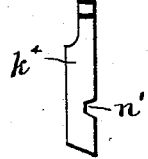
Figure 12:
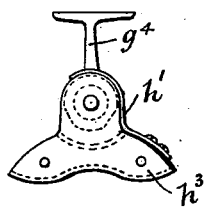
Figure 13:
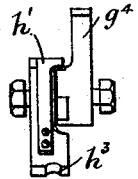
Figure 14:
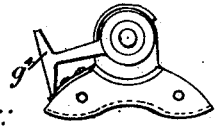

Figure 1 is a side elevation of my gear turned outboard in the position ready for firing and also for lifting the torpedo out of the water when exercising. Fig. 2 is a front elevation of Fig. 1. Fig. 3 is a plan of Figs. 1 and 2. Fig. 4 is an elevation of firing-lever; Fig. 5, a plan of said firing-lever. Fig. 6 is a side elevation of a spreader which is used to lock the tongs. Fig. 7 is a front elevation of the said spreader; Fig. 8, an elevation of a sprocket and spur wheel hereinafter described; Fig. 9, a half vertical section of Fig. 8; Fig. 10, an elevation of a pinion which meshes with spur-wheel shown at Fig. 8; Fig. 11, an end elevation of pinion shown at Fig. 10. Fig. 12 shows a side elevation of a grooved block spring and pawl which engages with spur-wheel shown at Fig. 8. Fig. 13 is a front elevation of Fig. 12. Fig. 14 is a rear side elevation of Figs. 12 and 13. Fig. 15 shows a plan of a clearance-fork; Fig. 16, an elevation of Fig. 15. Fig. 17 is a longitudinal sectional view of the tongs or shaft from the center of the recessed seat of each curved arm, showing the position of the parts ready for firing. Fig. 18 is an outside plan of the tong-tube, showing the collars and slots hereinafter described. Fig. 19 shows an alternative arrangement for dispatching the torpedo brought about by the explosion of a cartridge by means of an electric current. Fig. 20 is an end view of Fig. 19. Fig. 21 is an elevation of one of the two plumber-blocks or bearings which carry the tube or axle shaft of the davits. Fig. 22 shows a front elevation of a plumber-block and a part of the tube or shaft carrying the davits. Fig. 23 is a view of the tube or shaft which carries the davits, also showing the cotters against a portion of the latter and the pins through said cotters. Fig. 24 is a portion of the curved arm projecting from one of the davits, showing the form of recessed seat which receives the tong-tube. Fig. 25 shows a view of the tongs open to receive a torpedo.

Similar letters of reference indicate similar or corresponding parts where they occur in the several views.

The scale of Figs. 1, 2, and 3 is one inch equal one foot. The scale of the remaining figures is three inches equal one foot.

The manner in which I construct my dropping-gear will be understood from the following description:

$a$ represents a tubular axle or shaft arranged in two plumber-blocks or bearings $a'$ and $a^2$, bolted to the deck of a torpedo-boat or other vessel. $a^3$ and $a^4$ represent two davits, the bottom portion of each of which is affixed to said shaft $a$ by cotters or keys $b$ and $b'$. $b^2$ and $b^3$ are safety-pins (shown at Fig. 23) inserted to hold said cotters in position. $b^4$ and $c$ are curved arms projected from said davits and provided each with a recessed seat $c'$ for the tong-tube hereinafter described.

$c^2$ and $c^3$ are partly-screwed securing-pins inserted in holes or eyes corresponding with each other in the bottom portion of each davit and the top portion of each davit and the top portion of each plumber-block to hold the davits outboard or inboard or in any other position. A chafing-block, such as $c^5$, is secured between each of the two cheeks of the davits to avoid injury to the shell of the torpedo when secured inboard.

$c^4$ and $d$ are the two purchase-chains, which are used simultaneously to turn the gear inboard or lower it outboard and for lowering the tongs to recover the torpedo from the water when practicing. These chains are connected to shackles $d'$ and $d^2$, carrying the tong-tube $d^3$. Said chains are carried over the sprocket-wheels $d^4$ and $e$, each being connected with a shackle or carrier provided with cheeks, which are formed into bearings to carry the tong-tube. The inboard end of chain has a swivel and is secured to a cleat or hook affixed to the deck of the vessel. Each of the shackles or carriers has a slotted shank $e'$, with an eye to which both the aforesaid chains are connected. A cotter $e^2$ is inserted in each of said slotted shanks, and rests upon a seat $e^3$, (which also acts as a guide-plate,) having a central opening or perforation for chain. Said seat is secured between two cheeks of the upper portion of the curved arms $b^4$ and $c$. By this means the tong-tube can be easily placed in or recovered or released from the curved arms and lowered to the water to recover the torpedo and replace it in position for recharging, readjusting, and firing when at practice.

$e^4$ is a tube extended from and secured by two lock-nuts $f$ and $f$ to each davit to brace the top ends of the latter. This tube $e^4$ receives a spindle $f'$, which is revolved by means of two handles $f^2$ and $f^2$, one at each end. The boss of each handle acts as a shoulder to prevent the spindle moving laterally.

$f^3$ and $f^4$ represent two pinions, each of which is arranged upon that part of the spindle between the two cheeks of each davit.

$g'$ and $g'$ are spur-wheels arranged to revolve freely upon rigid pins or bolts which form the axis.

Each of the sprocket-wheels before mentioned is cast upon one side of the spur-wheel to carry the aforesaid chains $c^4$ and $d$.

$g^2$ and $g^3$ are clearance-forks, which are used to prevent the two chains $c^4$ and $d$ from jamming upon the sprocket-wheels when the purchase is used in either direction.

$g^4$ and $h$ are pawls engaging with the spur-wheels $g$ and $g'$. These pawls are pivoted in the top end of the davits and kept in gear with the spur-wheels by means of flat springs $h'$ and $h^2$.

$h^3$ and $h^4$ are grooved blocks secured upon the same bolt and pin carrying the pawls $g^4$ and $h$. These blocks confine the chains $c^4$ and $d$ in the sprocket-wheels aforesaid.

By the adaptation and arrangement of the aforesaid gear wheels and chains the tong-tube and tongs with torpedo can be uniformly lowered from the aforesaid recessed seats in the curved arms $b^4$ and $c$, and to replace the said tong-tube in the latter it is only necessary to revolve the before-mentioned spindle $f'$ by the handles $f^2$ and $f^2$ and replace the cotters in the slotted shackles or carriers.

$i$ and $i'$ are torpedo-tongs arranged upon the aforesaid tube $d^3$. $i^2$ and $i^3$ are collars secured to said tube $d^3$ to keep the jaw of each pair of tongs together. Each jaw of tongs is made of two curved pieces, between which two eccentric sheaves are arranged at suitable distances for carrying the torpedo pins or bolts, (one for each sheave,) and are secured in each jaw. The top eccentrics $j$ $j$ and $j'$ $j'$ may work off their axes, say, half an inch or more, if desired. The other eccentrics $j^2$ and $j^3$ in each jaw also work off their axes to suit torpedoes of different diameters. Thus it will be seen that there are four eccentrics in each pair of tongs. The pins $j^4$ and $j^4$ are extended from the side of two jaws of tongs to receive hooks, pivoted one to each davit, as shown, Fig. 2, to prevent the tongs with torpedo from rolling or swaying when placed inboard. The top portion of each jaw upon one side of said tongs has two projections or horns $k$ and $k^2$, while the jaws upon the side of tube have also each two projections $k'$ and $k'$. The top projections, lettered $k$ and $k^2$, carry the bar $k^3$, termed the "spreader-bar," provided with two spreaders $k^4$ and $k^5$. The other projections $k'$ and $k'$ are curved downward to cause the tongs to close automatically when lowered upon the torpedo to recover it. The top projections $k^2$ and $k^2$ of the opposite jaws of tongs carry a rod $l$, which is engaged by the hooked end of each spreader. The slotted end $l'$ of each of the latter is fitted upon the spreader-bar $k^3$.

$l^2$ and $l^2$ respresent slots, one in each jaw of tongs. A feather is secured in the under side of said tong-tube between the aforesaid collars $i^2$ and $i^3$ to limit the opening and closing of the tongs.

$l^4$ and $l^5$, Figs. 13 and 17, represent two tierods, each of which is connected with each pair of tongs. These rods cause the tongs to open or close simultaneously.

$m$ is a firing-bar, which is actuated by a firing-lever $m'$ (or by a blowing charge) and is free to move laterally in the said tong-tube. The firing-lever is fulcrumed upon a pin $m^2$, carried by two cheeks formed upon the sleeve $m^3$, fitting upon the tong-tube.

$m^4$ and $m^5$ represent two studs secured in the firing-bar to permit the firing-lever to actuate the latter.

$n$ is a pin, termed the "safety-pin," inserted into a hole in the tong-tube and the firing-bar to lock or secure the two latter until the torpedo is ready to be dispatched.

$n'$ and $n'$ are recesses or gullets formed in the leg of each spreader to receive the projections $n^2$ of the inclined planes of firing-bar. The before-mentioned pin $n$ and the projections $n^2$ prevent the spreader being released from the rod $l$ when a torpedo is in the tongs.

When the safety-pin is withdrawn, the firing-lever may be actuated, which consequently moves the firing-bar and the screwed spindle with a lever-tripper, hereinafter described.

$n^3$ and $n^4$ represent two inclined planes secured in the firing-bar by means of two pins or rivets, such as O and O'. A slot $O^2$ is made in the top side of the tong-tube, and also in the firing-bar, to allow the legs of the spreaders to engage with the inclined planes $n^3$ and $n^4$.

$p$ is a drop-catch with a recess formed in the bottom part to receive the fin usually fitted upon torpedoes. This drop-catch keeps the torpedo in its proper position when exercising or maneuvering until dispatched.

$q$ is the screwed spindle before mentioned, arranged in the tong-tube and connected to the firing-bar $m$. Upon this screwed spindle a tapped sleeve or nut $q'$, Fig. 16, is fitted to carry the adjustable air-lever tripper $r$, having a central slot and lock-nut $r'$ to secure it after adjusting its height vertically, and by means of a handle $r^2$ it may be adjusted laterally to come into contact with the air-lever used upon the several classes of torpedoes. The inner end of said spindle $q$ is connected to the firing-bar $m$ by means of two pins $r^3$ engaging with a groove or recess formed in the periphery of the bush shown.

I do not confine myself to the use of the firing-lever $m'$, as before described, as I may dispense with it and use instead the electrical firing arrangement illustrated at Fig. 19. In this case I form a combustion-chamber $s$ by arranging a flanged disk $s'$ upon the fore end of tong-tube. This disk has a central opening or aperture with a recess in the front side to receive and hold a cartridge, such as $t$. Near the outside edge of said disk $s'$ I pivot a breech-block $t'$, having a slot $t^2$, extended from its center to the bottom edge to permit two electrical wires from a suitable battery to connect with the cartridge, as well as to hold the latter while exploding, and also to allow the removal of the breech-block from its place in order to extract the exploded cartridge and renew the charge. In the end of the before-mentioned firing-bar $m$ (shown at Fig. 19) I insert a screwed plug $t^3$ to effectually close the combustion-chamber. By this means, when the cartridge is exploded in the latter, the firing-bar is actuated by the force of such explosion.

A series of vent-holes, such as $t^4$, is made in the tong-tube at the end of the stroke of firing-bar to allow the superfluous gas arising from the explosion to escape from the combustion-chamber to avoid injury to the tong-tube or firing-bar.

The following parts of my gear are made of brass: the plumber-blocks $a'$ and $a^2$, air-lever tripper $v$, sprocket-wheels $d^4$ and $e'$, screwed spindle $q$ and its nut, caps upon ends of tong-tube $d^3$, combustion-chamber $s$, and fin for crutch $p$. The eccentric sheaves and chafing-blocks are made of box or hard wood, while the other parts of gear are made of steel.

My dropping-gear may be extended to either one of two positions, a first and a second position. When the boat is exercising or maneuvering in rough water, the gear is set up to the first position; but when in smooth water the gear is extended to the second position, which is the outermost one.

The mode of operating my dropping-gear for the launch and dispatch of a torpedo is as follows: A torpedo is first placed in the tongs, then charged and adjusted in the usual manner. This is easily effected, because the air-inlet plug is easily accessible in the several patterns of the maneuvered class of torpedoes the diameter of which vary. They are either twelve inches, fourteen inches, or fifteen inches. After charging and adjusting the torpedo while in the tongs with the gear at the inboard position, as represented by dotted lines, Fig. 1, the davits are turned to the first or second outboard position. The two purchase-chains $c^4$ and $d$ carried by the sprocket-wheels are next operated simultaneously by turning the handles $f^2$ and $f^2$ for the purpose of lowering the gear carrying the torpedo to an outboard position. A firing-line is attached to the lever $m'$ and the safety-pin $n$ withdrawn. The line when pulled actuates the firing-bar $m$ laterally, causing the inclined planes $n^3$ and $n^4$ to impart a vertical movement to the legs of the spreaders $k^4$ and $k^5$, the hooked ends of which are thereby released from the tie-rod $l$, consequently opening the tongs and throwing the air-lever simultaneously backwardly and horizontally. By this action the tripper engages the air-lever, which opens the torpedo stop-valve. This valve when opened admits the air freely to propel the engine of the torpedo, which then drops into the water and takes up its running. When the electrical firing arrangement shown at Fig. 19 is used in lieu of the firing-lever and line, the blowing charge or cartridge is inserted and exploded in the combustion-chamber s in the fore end of the tong-tube. The firing-bar gives a similar result as that before described.

I claim—

1. The combination, with suitable lowering devices, of the tong-tube, the tongs connected therewith, a firing-tube sliding in the tong-tube, spreading devices connecting the firing-tube with the tongs, and actuating means for the firing-tube, substantially as set forth.

2. The combination, with the davits having arms provided with seats $c'$ and a lowering mechanism, of a tong-tube adapted to fit said seats and connected with the lowering mechanism, tongs on said tube, spreading devices for said tongs, a firing-tube sliding in the tong-tube, and means for actuating the firing-tube, substantially as set forth.

3. In a torpedo-dropping gear, the combination, with the tong-tube, tongs connected therewith, and the firing-tube within the tong-tube, of screw $q$, having an operating-handle and connected with the firing-tube, a nut engaging the screw, and the air-lever tripper $r$, mounted on the nut, substantially as set forth.

4. The combination, with the tong-tube and tongs connected therewith, of the spreading mechanism comprising the spreaders $k^4$ $k^5$, inclined planes $n^4$ $n^3$, mounted in the tong-tube, and an actuating mechanism for moving said planes longitudinally in the tong-tube, substantially as set forth.

5. The combination, with the tong-tube, tongs connected therewith, the firing-tube mounted within the tong-tube, of a spreading mechanism connecting the tongs with the firing-tube, and the firing-lever $m'$, mounted on the tong-tube and engaging the firing-tube to actuate the latter, substantially as set forth.

In witness whereof I have hereunto set my hand in presence of two witnesses.

CARDIGAN DANN.

Witnesses:
ALBERT SWANSON,
C. HARRISON.